(12) United States Patent
Durkee

(10) Patent No.: US 9,625,638 B2
(45) Date of Patent: Apr. 18, 2017

(54) OPTICAL WAVEGUIDE BODY

(71) Applicant: Cree, Inc., Durham, NC (US)

(72) Inventor: John W. Durkee, Raleigh, NC (US)

(73) Assignee: Cree, Inc., Durham, NC (US)

( * ) Notice: Subject to any disclaimer, the term of this patent is extended or adjusted under 35 U.S.C. 154(b) by 285 days.

(21) Appl. No.: 13/841,074

(22) Filed: Mar. 15, 2013

(65) Prior Publication Data

US 2014/0270672 A1    Sep. 18, 2014

(51) Int. Cl.
*G02B 6/10* (2006.01)
*F21V 8/00* (2006.01)

(52) U.S. Cl.
CPC ......... *G02B 6/0038* (2013.01); *G02B 6/0046* (2013.01); *G02B 6/0065* (2013.01)

(58) Field of Classification Search
CPC ....... G02B 6/0038; G02B 6/0046; G02B 6/10
See application file for complete search history.

(56) References Cited

U.S. PATENT DOCUMENTS

| | | | |
|---|---|---|---|
| 615,108 A | 11/1898 | De Segundo | |
| 766,515 A | 8/1904 | Northrup | |
| D67,806 S | 7/1925 | Hoyt et al. | |
| 2,043,951 A | 6/1936 | Eksergian | |
| 2,992,587 A * | 7/1961 | Hicks, Jr. et al. | ............ 385/116 |
| 3,372,740 A | 3/1968 | Kastovich et al. | |
| 3,532,871 A | 10/1970 | Shipman | |
| D219,546 S | 12/1970 | Kaiser et al. | |
| 4,146,297 A | 3/1979 | Alferness et al. | |
| 4,441,787 A | 4/1984 | Lichtenberger | |
| 4,714,983 A | 12/1987 | Lang | |
| D298,861 S | 12/1988 | Ewing et al. | |
| 4,954,930 A | 9/1990 | Maegawa et al. | |
| 4,977,486 A | 12/1990 | Gotoh | |
| 5,005,108 A * | 4/1991 | Pristash et al. | ............... 362/602 |
| 5,009,483 A | 4/1991 | Rockwell, III | |
| 5,026,161 A | 6/1991 | Werner | |
| 5,040,098 A | 8/1991 | Tanaka et al. | |
| 5,047,761 A | 9/1991 | Sell | |
| 5,061,404 A | 10/1991 | Wu et al. | |
| 5,097,258 A | 3/1992 | Iwaki | |

(Continued)

FOREIGN PATENT DOCUMENTS

| | | |
|---|---|---|
| DE | 20014114 | 12/2000 |
| DE | 20107425 | 7/2001 |

(Continued)

OTHER PUBLICATIONS

Web page at http://www.fusionoptix.com/lighting/components/array-optics.htm, printed May 9, 2013 (2 pages).

(Continued)

*Primary Examiner* — Daniel Petkovsek
(74) *Attorney, Agent, or Firm* — McCracken & Gillen LLC

(57) ABSTRACT

An optical waveguide body includes a first layer of optically transmissive material and a second layer of optically transmissive material in contact with the first layer. At least one of the first and second layers is tapered and the first layer has a first index of refraction and the second layer has a second index of refraction less than the first index of refraction and the first and second indices of refraction are both greater than about 1.0.

15 Claims, 3 Drawing Sheets

(56) References Cited

U.S. PATENT DOCUMENTS

| | | | |
|---|---|---|---|
| 5,113,177 | A | 5/1992 | Cohen |
| 5,113,472 | A | 5/1992 | Gualtieri et al. |
| 5,171,080 | A | 12/1992 | Bathurst |
| 5,175,787 | A | 12/1992 | Gualtieri et al. |
| 5,186,865 | A | 2/1993 | Wu et al. |
| 5,245,689 | A | 9/1993 | Gualtieri |
| 5,253,317 | A | 10/1993 | Allen et al. |
| 5,295,019 | A | 3/1994 | Rapoport |
| 5,309,544 | A | 5/1994 | Saxe |
| 5,359,687 | A | 10/1994 | McFarland |
| 5,359,691 | A | 10/1994 | Tai et al. |
| 5,396,350 | A | 3/1995 | Beeson et al. |
| 5,398,179 | A | 3/1995 | Pacheco |
| 5,400,224 | A | 3/1995 | DuNah et al. |
| 5,428,468 | A | 6/1995 | Zimmerman et al. |
| 5,461,547 | A | 10/1995 | Ciupke et al. |
| 5,462,700 | A | 10/1995 | Beeson et al. |
| 5,481,385 | A | 1/1996 | Zimmerman et al. |
| 5,485,354 | A * | 1/1996 | Ciupke ............... G02B 6/0038 349/62 |
| 5,506,924 | A | 4/1996 | Inoue |
| 5,521,725 | A * | 5/1996 | Beeson et al. ............... 349/95 |
| 5,521,726 | A | 5/1996 | Zimmerman et al. |
| 5,528,720 | A | 6/1996 | Winston et al. |
| 5,537,304 | A | 7/1996 | Klaus |
| 5,541,039 | A | 7/1996 | McFarland et al. |
| 5,548,670 | A | 8/1996 | Koike |
| 5,553,092 | A | 9/1996 | Bruce et al. |
| 5,555,109 | A | 9/1996 | Zimmerman et al. |
| 5,555,160 | A | 9/1996 | Tawara et al. |
| 5,555,329 | A | 9/1996 | Kuper et al. |
| 5,572,411 | A | 11/1996 | Watai et al. |
| 5,577,492 | A | 11/1996 | Parkyn, Jr. et al. |
| 5,584,556 | A | 12/1996 | Yokoyama et al. |
| 5,598,280 | A | 1/1997 | Nishio et al. |
| 5,598,281 | A | 1/1997 | Zimmerman et al. |
| 5,613,751 | A | 3/1997 | Parker et al. |
| 5,613,770 | A | 3/1997 | Chin, Jr. et al. |
| 5,624,202 | A | 4/1997 | Grierson |
| 5,657,408 | A | 8/1997 | Ferm et al. |
| 5,658,066 | A | 8/1997 | Hirsch |
| 5,659,410 | A | 8/1997 | Koike et al. |
| 5,676,453 | A | 10/1997 | Parkyn, Jr. et al. |
| 5,676,457 | A | 10/1997 | Simon |
| 5,677,702 | A | 10/1997 | Inoue et al. |
| 5,685,634 | A | 11/1997 | Mulligan |
| 5,696,865 | A | 12/1997 | Beeson et al. |
| 5,702,176 | A | 12/1997 | Engle |
| 5,718,497 | A | 2/1998 | Yokoyama et al. |
| 5,727,107 | A | 3/1998 | Umemoto et al. |
| 5,735,590 | A | 4/1998 | Kashima et al. |
| 5,739,931 | A | 4/1998 | Zimmerman et al. |
| 5,748,828 | A | 5/1998 | Steiner et al. |
| 5,761,355 | A | 6/1998 | Kuper et al. |
| 5,769,522 | A * | 6/1998 | Kaneko et al. ............... 362/619 |
| 5,771,039 | A | 6/1998 | Ditzik |
| 5,777,857 | A | 7/1998 | Degelmann |
| 5,806,955 | A | 9/1998 | Parkyn, Jr. et al. |
| 5,812,714 | A | 9/1998 | Hulse |
| 5,818,555 | A | 10/1998 | Yokoyama et al. |
| 5,839,823 | A | 11/1998 | Hou et al. |
| 5,850,498 | A | 12/1998 | Shacklette et al. |
| 5,854,872 | A | 12/1998 | Tai |
| 5,863,113 | A | 1/1999 | Oe et al. |
| 5,872,883 | A | 2/1999 | Ohba et al. |
| 5,897,201 | A | 4/1999 | Simon |
| 5,914,759 | A | 6/1999 | Higuchi et al. |
| 5,914,760 | A * | 6/1999 | Daiku ............... 349/65 |
| 5,949,933 | A | 9/1999 | Steiner et al. |
| 5,961,198 | A | 10/1999 | Hira et al. |
| 5,967,637 | A | 10/1999 | Ishikawa et al. |
| 5,974,214 | A | 10/1999 | Shacklette et al. |
| 5,997,148 | A | 12/1999 | Ohkawa |
| 5,999,281 | A | 12/1999 | Abbott et al. |
| 5,999,685 | A | 12/1999 | Goto et al. |
| 6,002,829 | A * | 12/1999 | Winston et al. ............... 385/146 |
| 6,007,209 | A | 12/1999 | Pelka |
| 6,043,951 | A | 3/2000 | Lee |
| 6,044,196 | A | 3/2000 | Winston et al. |
| 6,079,838 | A | 6/2000 | Parker et al. |
| 6,097,549 | A | 8/2000 | Jenkins et al. |
| 6,134,092 | A | 10/2000 | Pelka et al. |
| 6,139,176 | A | 10/2000 | Hulse et al. |
| 6,147,725 | A * | 11/2000 | Yuuki ............... G02B 6/0036 349/61 |
| 6,151,089 | A | 11/2000 | Yang et al. |
| 6,155,692 | A | 12/2000 | Ohkawa |
| 6,155,693 | A | 12/2000 | Spiegel et al. |
| 6,161,939 | A | 12/2000 | Bansbach |
| 6,164,790 | A | 12/2000 | Lee |
| 6,164,791 | A | 12/2000 | Gwo-Juh et al. |
| 6,167,182 | A | 12/2000 | Shinohara et al. |
| 6,185,357 | B1 | 2/2001 | Zou et al. |
| 6,206,535 | B1 | 3/2001 | Hattori et al. |
| 6,231,200 | B1 | 5/2001 | Shinohara et al. |
| 6,232,592 | B1 | 5/2001 | Sugiyama |
| 6,241,363 | B1 | 6/2001 | Lee |
| 6,257,737 | B1 | 7/2001 | Marshall et al. |
| 6,259,854 | B1 | 7/2001 | Shinji et al. |
| D446,333 | S | 8/2001 | Frois |
| 6,304,693 | B1 | 10/2001 | Buelow, II et al. |
| 6,310,704 | B1 | 10/2001 | Dogan et al. |
| 6,379,016 | B1 | 4/2002 | Boyd et al. |
| 6,379,017 | B2 | 4/2002 | Nakabayashi et al. |
| 6,400,086 | B1 | 6/2002 | Huter |
| 6,421,103 | B2 | 7/2002 | Yamaguchi |
| 6,443,594 | B1 | 9/2002 | Marshall et al. |
| 6,461,007 | B1 | 10/2002 | Akaoka |
| 6,473,554 | B1 | 10/2002 | Pelka et al. |
| 6,480,307 | B1 | 11/2002 | Yang et al. |
| 6,485,157 | B2 | 11/2002 | Ohkawa |
| 6,508,563 | B2 | 1/2003 | Parker et al. |
| 6,523,986 | B1 | 2/2003 | Hoffmann |
| 6,536,921 | B1 | 3/2003 | Simon |
| 6,541,720 | B2 | 4/2003 | Gerald et al. |
| 6,554,451 | B1 | 4/2003 | Keuper |
| 6,568,819 | B1 | 5/2003 | Yamazaki et al. |
| 6,582,103 | B1 | 6/2003 | Popovich et al. |
| 6,585,356 | B1 | 7/2003 | Ohkawa |
| 6,598,998 | B2 | 7/2003 | West et al. |
| 6,612,723 | B2 | 9/2003 | Futhey et al. |
| 6,616,290 | B2 | 9/2003 | Ohkawa |
| 6,629,764 | B1 | 10/2003 | Uehara |
| 6,633,722 | B1 | 10/2003 | Kohara et al. |
| 6,634,772 | B2 | 10/2003 | Yaphe et al. |
| 6,637,924 | B2 | 10/2003 | Pelka et al. |
| 6,647,199 | B1 | 11/2003 | Pelka et al. |
| 6,652,109 | B2 | 11/2003 | Nakamura |
| 6,659,628 | B2 | 12/2003 | Gomez Del Campo |
| 6,671,452 | B2 | 12/2003 | Winston et al. |
| 6,676,284 | B1 | 1/2004 | Wynne Willson |
| 6,678,021 | B2 | 1/2004 | Ohkawa |
| 6,679,621 | B2 | 1/2004 | West et al. |
| 6,712,481 | B2 | 3/2004 | Parker et al. |
| 6,724,529 | B2 | 4/2004 | Sinkoff |
| 6,724,543 | B1 | 4/2004 | Chinniah et al. |
| 6,727,965 | B1 | 4/2004 | Kubota |
| 6,752,505 | B2 | 6/2004 | Parker et al. |
| 6,755,546 | B2 | 6/2004 | Ohkawa |
| 6,755,556 | B2 | 6/2004 | Gasquet et al. |
| 6,758,582 | B1 | 7/2004 | Hsiao et al. |
| 6,775,460 | B2 | 8/2004 | Steiner et al. |
| 6,796,676 | B2 | 9/2004 | Severtson et al. |
| 6,802,626 | B2 | 10/2004 | Belfer et al. |
| 6,802,628 | B2 | 10/2004 | Kuo |
| 6,840,656 | B2 | 1/2005 | Kuo |
| 6,845,212 | B2 * | 1/2005 | Gardiner et al. ............... 385/146 |
| 6,854,857 | B2 | 2/2005 | Hara et al. |
| 6,876,408 | B2 | 4/2005 | Yamaguchi |
| 6,894,740 | B2 | 5/2005 | Ohkawa |
| 6,896,381 | B2 | 5/2005 | Benitez et al. |
| 6,924,943 | B2 | 8/2005 | Minano et al. |
| D511,221 | S | 11/2005 | Zucker |
| 6,974,241 | B2 | 12/2005 | Hara et al. |

(56) References Cited

U.S. PATENT DOCUMENTS

| | | | |
|---|---|---|---|
| 6,992,335 B2 | 1/2006 | Ohkawa | |
| 7,008,097 B1 | 3/2006 | Hulse | |
| 7,021,805 B2 | 4/2006 | Armano et al. | |
| 7,025,482 B2 | 4/2006 | Yamashita et al. | |
| 7,046,318 B2 | 5/2006 | Yu et al. | |
| 7,046,905 B1 * | 5/2006 | Gardiner et al. | 385/146 |
| 7,063,430 B2 | 6/2006 | Greiner | |
| 7,072,096 B2 | 7/2006 | Holman et al. | |
| 7,083,313 B2 | 8/2006 | Smith | |
| 7,085,460 B2 | 8/2006 | Leu et al. | |
| 7,090,370 B2 | 8/2006 | Clark et al. | |
| 7,090,389 B2 | 8/2006 | Parker et al. | |
| 7,097,341 B2 | 8/2006 | Tsai | |
| 7,106,528 B2 | 9/2006 | Ohmori et al. | |
| 7,111,969 B2 | 9/2006 | Bottesch et al. | |
| 7,118,253 B1 | 10/2006 | Simon | |
| 7,131,764 B2 | 11/2006 | Hsu et al. | |
| 7,152,985 B2 | 12/2006 | Benitez et al. | |
| 7,160,010 B1 | 1/2007 | Chinniah et al. | |
| 7,160,015 B2 | 1/2007 | Parker | |
| 7,168,841 B2 | 1/2007 | Hsieh et al. | |
| 7,175,330 B1 | 2/2007 | Chen | |
| 7,178,941 B2 | 2/2007 | Roberge et al. | |
| 7,178,946 B2 | 2/2007 | Saccomanno et al. | |
| 7,182,480 B2 | 2/2007 | Kan | |
| 7,192,174 B2 | 3/2007 | Myoung | |
| 7,195,374 B2 | 3/2007 | Saccomanno et al. | |
| 7,204,634 B2 | 4/2007 | Chen et al. | |
| 7,209,628 B2 | 4/2007 | Winston et al. | |
| 7,222,995 B1 | 5/2007 | Bayat et al. | |
| 7,223,004 B2 | 5/2007 | Chen et al. | |
| 7,246,931 B2 | 7/2007 | Hsieh et al. | |
| 7,258,467 B2 | 8/2007 | Saccomanno et al. | |
| 7,265,800 B2 | 9/2007 | Jagt et al. | |
| 7,273,299 B2 | 9/2007 | Parkyn et al. | |
| 7,290,906 B2 | 11/2007 | Suzuki et al. | |
| 7,292,767 B2 | 11/2007 | Cheng | |
| D563,036 S | 2/2008 | Miyairi et al. | |
| D565,778 S | 4/2008 | Pedersen | |
| 7,364,342 B2 | 4/2008 | Parker et al. | |
| D568,529 S | 5/2008 | Colleran, Jr. et al. | |
| 7,369,918 B2 | 5/2008 | Cosgrove | |
| 7,393,124 B1 | 7/2008 | Williams | |
| 7,399,108 B2 | 7/2008 | Ayabe et al. | |
| 7,400,809 B2 | 7/2008 | Erben et al. | |
| 7,404,660 B2 | 7/2008 | Parker | |
| D575,898 S | 8/2008 | Tran et al. | |
| 7,422,357 B1 | 9/2008 | Chang | |
| 7,455,416 B2 | 11/2008 | Chen | |
| 7,458,714 B2 | 12/2008 | Chang | |
| 7,465,074 B2 | 12/2008 | Blumel | |
| 7,486,854 B2 | 2/2009 | Van Ostrand et al. | |
| 7,488,093 B1 | 2/2009 | Huang et al. | |
| 7,513,672 B2 | 4/2009 | Parker | |
| 7,520,650 B2 | 4/2009 | Smith | |
| 7,534,013 B1 | 5/2009 | Simon | |
| 7,559,672 B1 | 7/2009 | Parkyn et al. | |
| 7,566,148 B2 | 7/2009 | Noh et al. | |
| 7,566,159 B2 | 7/2009 | Oon et al. | |
| 7,581,854 B2 | 9/2009 | Ford | |
| D604,002 S | 11/2009 | Santoro | |
| 7,614,764 B2 | 11/2009 | Williams et al. | |
| 7,626,655 B2 | 12/2009 | Yamazaki et al. | |
| 7,628,508 B2 | 12/2009 | Kita et al. | |
| 7,635,193 B2 | 12/2009 | Chang | |
| 7,635,205 B2 | 12/2009 | Yu et al. | |
| 7,639,918 B2 | 12/2009 | Sayers et al. | |
| 7,641,363 B1 | 1/2010 | Chang et al. | |
| 7,648,256 B2 | 1/2010 | Shiratsuchi et al. | |
| 7,654,719 B2 | 2/2010 | Chang | |
| 7,663,804 B2 | 2/2010 | Chang | |
| 7,674,018 B2 | 3/2010 | Holder et al. | |
| 7,696,531 B2 | 4/2010 | Miyao | |
| 7,703,945 B2 | 4/2010 | Leung et al. | |
| 7,703,950 B2 | 4/2010 | Ewert et al. | |
| 7,703,967 B2 | 4/2010 | Parker | |
| 7,710,663 B2 | 5/2010 | Barnes et al. | |
| 7,722,224 B1 | 5/2010 | Coleman et al. | |
| 7,722,241 B2 | 5/2010 | Chang | |
| 7,724,321 B2 | 5/2010 | Hsieh et al. | |
| D617,489 S | 6/2010 | Santoro | |
| D618,842 S | 6/2010 | Ngai et al. | |
| 7,730,967 B2 | 6/2010 | Ballantyne et al. | |
| 7,736,019 B2 | 6/2010 | Shimada et al. | |
| 7,736,045 B2 | 6/2010 | Yamashita et al. | |
| 7,750,982 B2 | 7/2010 | Nelson et al. | |
| 7,753,551 B2 | 7/2010 | Yaphe et al. | |
| 7,758,227 B1 | 7/2010 | Coleman | |
| 7,760,290 B2 | 7/2010 | Kang et al. | |
| 7,762,705 B2 | 7/2010 | Sakai et al. | |
| D622,894 S | 8/2010 | Ngai et al. | |
| 7,766,515 B2 | 8/2010 | Condon et al. | |
| 7,771,087 B2 | 8/2010 | Wilcox et al. | |
| 7,775,697 B2 | 8/2010 | Hirano et al. | |
| 7,776,236 B2 | 8/2010 | Shih et al. | |
| 7,780,306 B2 | 8/2010 | Hoshi | |
| 7,784,954 B1 | 8/2010 | Coleman | |
| D623,793 S | 9/2010 | Ngai et al. | |
| 7,798,695 B2 | 9/2010 | Parker | |
| 7,806,581 B2 | 10/2010 | Lee | |
| 7,810,949 B2 | 10/2010 | Chang | |
| 7,810,960 B1 | 10/2010 | Soderman et al. | |
| 7,810,968 B1 | 10/2010 | Walker et al. | |
| 7,813,131 B2 | 10/2010 | Liang | |
| 7,821,982 B2 | 10/2010 | Chen et al. | |
| 7,826,698 B1 | 11/2010 | Meir et al. | |
| 7,845,826 B2 | 12/2010 | Aylward et al. | |
| 7,850,357 B2 | 12/2010 | Kim et al. | |
| 7,857,487 B2 | 12/2010 | Wu et al. | |
| 7,857,619 B2 | 12/2010 | Liu | |
| D631,601 S | 1/2011 | Lodhie | |
| 7,866,871 B2 | 1/2011 | Couzin et al. | |
| 7,905,646 B2 | 3/2011 | Adachi et al. | |
| 7,907,804 B2 | 3/2011 | Meir et al. | |
| 7,909,496 B2 | 3/2011 | Matheson et al. | |
| 7,914,192 B2 | 3/2011 | Coleman | |
| 7,914,193 B2 | 3/2011 | Peifer et al. | |
| 7,914,196 B2 | 3/2011 | Parker et al. | |
| 7,929,816 B2 | 4/2011 | Meir et al. | |
| 7,934,851 B1 | 5/2011 | Boissevain et al. | |
| 7,967,477 B2 | 6/2011 | Bloemen et al. | |
| 7,969,531 B1 * | 6/2011 | Li et al. | 349/65 |
| 7,970,246 B2 | 6/2011 | Travis et al. | |
| D641,923 S | 7/2011 | Radchenko et al. | |
| 7,976,204 B2 | 7/2011 | Li et al. | |
| D642,725 S | 8/2011 | Kong et al. | |
| 7,991,257 B1 | 8/2011 | Coleman | |
| 7,997,784 B2 | 8/2011 | Tsai | |
| 8,002,450 B2 | 8/2011 | Van Ostrand et al. | |
| D645,194 S | 9/2011 | Budike, Jr. et al. | |
| 8,033,674 B1 | 10/2011 | Coleman et al. | |
| 8,033,706 B1 | 10/2011 | Kelly et al. | |
| 8,038,308 B2 | 10/2011 | Greiner | |
| 8,047,696 B2 | 11/2011 | Ijzerman et al. | |
| 8,052,316 B2 | 11/2011 | Lee | |
| 8,054,409 B2 | 11/2011 | Hsieh et al. | |
| 8,057,056 B2 | 11/2011 | Zhu et al. | |
| 8,061,877 B2 | 11/2011 | Chang | |
| 8,064,743 B2 | 11/2011 | Meir et al. | |
| 8,067,884 B2 | 11/2011 | Li | |
| 8,070,345 B2 | 12/2011 | Zhang et al. | |
| 8,075,157 B2 | 12/2011 | Zhang et al. | |
| 8,087,807 B2 | 1/2012 | Liu et al. | |
| 8,092,068 B2 | 1/2012 | Parker et al. | |
| 8,096,671 B1 | 1/2012 | Cronk et al. | |
| 8,096,681 B2 | 1/2012 | Fang et al. | |
| D654,618 S | 2/2012 | Kong et al. | |
| 8,113,704 B2 | 2/2012 | Bae et al. | |
| 8,128,272 B2 | 3/2012 | Fine et al. | |
| 8,129,731 B2 | 3/2012 | Vissenberg et al. | |
| 8,152,339 B2 | 4/2012 | Morgan | |
| 8,152,352 B2 | 4/2012 | Richardson | |
| 8,162,524 B2 | 4/2012 | Van Ostrand et al. | |
| D659,880 S | 5/2012 | Maxik et al. | |

(56) References Cited

U.S. PATENT DOCUMENTS

| | | | |
|---|---|---|---|
| 8,172,447 B2 | 5/2012 | Meir et al. |
| 8,177,408 B1 | 5/2012 | Coleman |
| 8,182,128 B2 | 5/2012 | Meir et al. |
| 8,186,847 B2 | 5/2012 | Hu et al. |
| 8,189,973 B2 | 5/2012 | Travis et al. |
| D662,255 S | 6/2012 | Kluś |
| D662,256 S | 6/2012 | Kluś |
| D662,643 S | 6/2012 | Takahashi et al. |
| 8,192,051 B2 | 6/2012 | Dau et al. |
| 8,198,109 B2 | 6/2012 | Lerman et al. |
| 8,210,716 B2 | 7/2012 | Lerman et al. |
| 8,212,263 B2 | 7/2012 | Bierhuizen et al. |
| 8,218,920 B2 | 7/2012 | Van Ostrand et al. |
| 8,220,955 B2 | 7/2012 | Kwak et al. |
| 8,220,980 B2 | 7/2012 | Gingrich, III |
| 8,226,287 B2 | 7/2012 | Teng et al. |
| 8,231,256 B1 | 7/2012 | Coleman et al. |
| 8,231,258 B2 | 7/2012 | Kim et al. |
| 8,231,259 B2 | 7/2012 | Keller et al. |
| 8,242,518 B2 | 8/2012 | Lerman et al. |
| 8,246,187 B2 | 8/2012 | Cheong et al. |
| 8,246,197 B2 | 8/2012 | Huang |
| 8,249,408 B2 | 8/2012 | Coleman |
| 8,258,524 B2 | 9/2012 | Tan et al. |
| 8,272,756 B1 | 9/2012 | Patrick |
| 8,272,770 B2 | 9/2012 | Richardson |
| 8,277,106 B2 | 10/2012 | Van Gorkom et al. |
| 8,282,261 B2 | 10/2012 | Pance et al. |
| 8,282,853 B2 | 10/2012 | Mori et al. |
| 8,283,354 B2 | 10/2012 | Wilson et al. |
| 8,283,853 B2 | 10/2012 | Yan et al. |
| 8,287,152 B2 | 10/2012 | Gill |
| 8,292,467 B2 | 10/2012 | Vissenberg et al. |
| 8,297,786 B2 | 10/2012 | Shani et al. |
| 8,297,801 B2 | 10/2012 | Coushaine et al. |
| 8,297,818 B2 | 10/2012 | Richardson |
| 8,301,002 B2 | 10/2012 | Shani |
| D670,422 S | 11/2012 | Siekmann |
| 8,310,158 B2 | 11/2012 | Coplin et al. |
| 8,314,566 B2 | 11/2012 | Steele et al. |
| 8,317,363 B2 | 11/2012 | Zheng |
| 8,317,366 B2 | 11/2012 | Dalton et al. |
| 8,319,130 B2 | 11/2012 | Lee et al. |
| 8,328,403 B1 | 12/2012 | Morgan et al. |
| 8,328,406 B2 | 12/2012 | Zimmermann |
| 8,331,746 B2 | 12/2012 | Bogner et al. |
| 8,338,199 B2 | 12/2012 | Lerman et al. |
| 8,338,839 B2 | 12/2012 | Lerman et al. |
| 8,338,840 B2 | 12/2012 | Lerman et al. |
| 8,338,841 B2 | 12/2012 | Lerman et al. |
| 8,338,842 B2 | 12/2012 | Lerman et al. |
| 8,344,397 B2 | 1/2013 | Lerman et al. |
| 8,348,446 B2 | 1/2013 | Nakamura |
| 8,348,489 B2 | 1/2013 | Holman et al. |
| 8,351,744 B2 | 1/2013 | Travis et al. |
| 8,353,606 B2 | 1/2013 | Jeong |
| 8,369,678 B2 | 2/2013 | Chakmakjian et al. |
| 8,371,735 B2 | 2/2013 | Chen et al. |
| 8,376,582 B2 | 2/2013 | Catone et al. |
| 8,382,354 B2 | 2/2013 | Kim et al. |
| 8,382,387 B1 | 2/2013 | Sandoval |
| 8,388,173 B2 | 3/2013 | Sloan et al. |
| 8,388,190 B2 | 3/2013 | Li et al. |
| 8,398,259 B2 | 3/2013 | Kwak et al. |
| 8,398,262 B2 | 3/2013 | Sloan et al. |
| D679,444 S | 4/2013 | Vasylyev |
| D681,262 S | 4/2013 | Lee |
| 8,408,737 B2 | 4/2013 | Wright et al. |
| 8,410,726 B2 | 4/2013 | Dau et al. |
| 8,412,010 B2 | 4/2013 | Ghosh et al. |
| 8,414,154 B2 | 4/2013 | Dau et al. |
| 8,419,224 B2 | 4/2013 | Wan-Chih et al. |
| 8,430,536 B1 | 4/2013 | Zhao |
| 8,430,548 B1 | 4/2013 | Kelly et al. |
| 8,432,628 B2 | 4/2013 | Shiau et al. |
| 8,434,892 B2 | 5/2013 | Zwak et al. |
| 8,434,893 B2 | 5/2013 | Boyer et al. |
| 8,434,913 B2 | 5/2013 | Vissenberg et al. |
| 8,434,914 B2 | 5/2013 | Li et al. |
| 8,449,128 B2 | 5/2013 | Ko et al. |
| 8,449,142 B1 | 5/2013 | Martin et al. |
| 8,454,218 B2 | 6/2013 | Wang et al. |
| 8,461,602 B2 | 6/2013 | Lerman et al. |
| 8,469,559 B2 | 6/2013 | Williams |
| 8,475,010 B2 | 7/2013 | Vissenberg et al. |
| 8,482,186 B2 | 7/2013 | Wang et al. |
| 8,485,684 B2 | 7/2013 | Lou et al. |
| 8,506,112 B1 | 8/2013 | Dau et al. |
| 8,511,868 B2 | 8/2013 | Haugaard et al. |
| 8,534,896 B2 | 9/2013 | Boonekamp |
| 8,534,901 B2 | 9/2013 | Panagotacos et al. |
| 8,541,795 B2 | 9/2013 | Keller et al. |
| 8,547,022 B2 | 10/2013 | Summerford et al. |
| 8,564,004 B2 | 10/2013 | Tarsa et al. |
| 8,567,983 B2 | 10/2013 | Boyer et al. |
| 8,567,986 B2 | 10/2013 | Szprengiel et al. |
| 8,573,823 B2 | 11/2013 | Dau et al. |
| 8,585,253 B2 | 11/2013 | Duong et al. |
| 8,591,072 B2 | 11/2013 | Shani et al. |
| 8,591,090 B2 | 11/2013 | Lin |
| 8,593,070 B2 | 11/2013 | Wang et al. |
| D695,447 S | 12/2013 | Speier et al. |
| 8,598,778 B2 | 12/2013 | Allen et al. |
| 8,602,586 B1 | 12/2013 | Dau et al. |
| 8,608,351 B2 | 12/2013 | Peifer |
| 8,616,746 B2 | 12/2013 | Shinohara |
| 8,618,735 B2 | 12/2013 | Coplin et al. |
| 8,632,214 B1 | 1/2014 | Tickner et al. |
| 8,641,219 B1 | 2/2014 | Johnson et al. |
| 8,657,479 B2 | 2/2014 | Morgan et al. |
| 8,696,173 B2 | 4/2014 | Urtiga et al. |
| 8,702,281 B2 | 4/2014 | Okada et al. |
| 8,724,052 B2 | 5/2014 | Hsieh et al. |
| 8,740,440 B2 | 6/2014 | Mizuno et al. |
| 8,755,005 B2 | 6/2014 | Bierhuizen et al. |
| 8,770,821 B2 | 7/2014 | Ijzerman et al. |
| 8,780,299 B2 | 7/2014 | Ryu et al. |
| 8,833,996 B2 | 9/2014 | Dau et al. |
| 8,833,999 B2 | 9/2014 | Wang et al. |
| 8,840,276 B2 | 9/2014 | Shani et al. |
| 8,851,712 B2 | 10/2014 | Shani et al. |
| 8,864,360 B2 | 10/2014 | Parker et al. |
| 8,870,431 B2 * | 10/2014 | Lin ............. G02B 6/0036 362/606 |
| 8,882,323 B2 | 11/2014 | Solomon et al. |
| 8,905,569 B2 | 12/2014 | Thomas et al. |
| 8,915,611 B2 | 12/2014 | Zhang |
| 8,917,962 B1 | 12/2014 | Nichol et al. |
| 8,950,919 B2 | 2/2015 | Chen |
| 8,960,969 B2 | 2/2015 | Freund |
| 8,975,827 B2 | 3/2015 | Chobot et al. |
| 9,046,225 B2 | 6/2015 | Meyers et al. |
| 9,081,125 B2 | 7/2015 | Dau et al. |
| 2001/0019479 A1 * | 9/2001 | Nakabayashi et al. ......... 362/31 |
| 2002/0061178 A1 | 5/2002 | Winston et al. |
| 2002/0145860 A1 | 10/2002 | Lee |
| 2002/0172039 A1 | 11/2002 | Inditsky |
| 2003/0034985 A1 | 2/2003 | Needham Riddle et al. |
| 2003/0146688 A1 | 8/2003 | Kitazawa et al. |
| 2004/0008952 A1 | 1/2004 | Kragl |
| 2004/0080938 A1 | 4/2004 | Holman et al. |
| 2004/0135933 A1 * | 7/2004 | Leu et al. .................. 349/61 |
| 2004/0146241 A1 | 7/2004 | Deladurantaye et al. |
| 2004/0202003 A1 | 10/2004 | Lyst, Jr. |
| 2004/0213003 A1 | 10/2004 | Lauderdale et al. |
| 2004/0240217 A1 | 12/2004 | Rice |
| 2005/0024744 A1 | 2/2005 | Falicoff et al. |
| 2005/0111235 A1 | 5/2005 | Suzuki et al. |
| 2005/0201103 A1 | 9/2005 | Saccomanno et al. |
| 2005/0210643 A1 | 9/2005 | Mezei et al. |
| 2005/0286251 A1 | 12/2005 | Smith |
| 2006/0002146 A1 | 1/2006 | Baba |
| 2006/0018623 A1 * | 1/2006 | Yu ............. G02B 6/0038 385/146 |

(56) References Cited

U.S. PATENT DOCUMENTS

| | | |
|---|---|---|
| 2006/0072203 A1 | 4/2006 | Lee |
| 2006/0076568 A1 | 4/2006 | Keller et al. |
| 2006/0187651 A1 | 8/2006 | Kim et al. |
| 2006/0262521 A1 | 11/2006 | Piepgras et al. |
| 2007/0081780 A1 | 4/2007 | Scholl |
| 2007/0086179 A1 | 4/2007 | Chen et al. |
| 2007/0121340 A1 | 5/2007 | Hoshi |
| 2007/0139905 A1 | 6/2007 | Birman et al. |
| 2007/0189033 A1 | 8/2007 | Watanabe et al. |
| 2007/0223247 A1 | 9/2007 | Lee et al. |
| 2007/0245607 A1 | 10/2007 | Awai et al. |
| 2007/0253058 A1 | 11/2007 | Wood |
| 2007/0274654 A1* | 11/2007 | Choudhury .......... G02B 6/1228 385/131 |
| 2008/0002399 A1 | 1/2008 | Villard et al. |
| 2008/0037284 A1 | 2/2008 | Rudisill |
| 2008/0094853 A1 | 4/2008 | Kim et al. |
| 2008/0137695 A1 | 6/2008 | Takahashi et al. |
| 2008/0186273 A1 | 8/2008 | Krijn et al. |
| 2008/0192458 A1 | 8/2008 | Li |
| 2008/0199143 A1 | 8/2008 | Turner |
| 2008/0266879 A1 | 10/2008 | Chang |
| 2008/0266901 A1 | 10/2008 | Chang |
| 2009/0027893 A1 | 1/2009 | Chang |
| 2009/0091948 A1 | 4/2009 | Wang et al. |
| 2009/0103293 A1 | 4/2009 | Harbers et al. |
| 2009/0196071 A1 | 8/2009 | Matheson et al. |
| 2009/0257242 A1 | 10/2009 | Wendman |
| 2009/0297090 A1 | 12/2009 | Bogner et al. |
| 2009/0309494 A1 | 12/2009 | Patterson et al. |
| 2009/0310367 A1 | 12/2009 | Kuo |
| 2009/0316414 A1 | 12/2009 | Yang et al. |
| 2010/0008088 A1 | 1/2010 | Koizumi et al. |
| 2010/0027257 A1 | 2/2010 | Boonekamp et al. |
| 2010/0046219 A1 | 2/2010 | Pijlman et al. |
| 2010/0053959 A1 | 3/2010 | Ijzerman et al. |
| 2010/0073597 A1 | 3/2010 | Bierhuizen et al. |
| 2010/0079843 A1 | 4/2010 | Derichs et al. |
| 2010/0079980 A1 | 4/2010 | Sakai |
| 2010/0110673 A1 | 5/2010 | Bergman et al. |
| 2010/0118531 A1 | 5/2010 | Montagne |
| 2010/0128483 A1 | 5/2010 | Reo et al. |
| 2010/0133422 A1 | 6/2010 | Lin et al. |
| 2010/0157577 A1 | 6/2010 | Montgomery et al. |
| 2010/0208460 A1 | 8/2010 | Ladewig et al. |
| 2010/0220484 A1 | 9/2010 | Shani et al. |
| 2010/0220497 A1 | 9/2010 | Ngai |
| 2010/0231143 A1 | 9/2010 | May et al. |
| 2010/0238645 A1 | 9/2010 | Bailey |
| 2010/0238671 A1 | 9/2010 | Catone et al. |
| 2010/0246158 A1 | 9/2010 | Van Gorkom et al. |
| 2010/0254129 A1 | 10/2010 | Le Toquin et al. |
| 2010/0301360 A1 | 12/2010 | Van De Ven et al. |
| 2010/0302218 A1 | 12/2010 | Bita et al. |
| 2010/0302616 A1 | 12/2010 | Bita et al. |
| 2010/0302783 A1 | 12/2010 | Shastry et al. |
| 2010/0302803 A1 | 12/2010 | Bita et al. |
| 2010/0315833 A1 | 12/2010 | Holman et al. |
| 2010/0320904 A1 | 12/2010 | Meir |
| 2010/0328936 A1 | 12/2010 | Pance et al. |
| 2011/0007505 A1 | 1/2011 | Wang et al. |
| 2011/0013397 A1 | 1/2011 | Catone et al. |
| 2011/0013420 A1 | 1/2011 | Coleman et al. |
| 2011/0037388 A1 | 2/2011 | Lou et al. |
| 2011/0044022 A1 | 2/2011 | Ko et al. |
| 2011/0044582 A1 | 2/2011 | Travis et al. |
| 2011/0051457 A1 | 3/2011 | Chen |
| 2011/0058372 A1 | 3/2011 | Lerman et al. |
| 2011/0063830 A1 | 3/2011 | Narendran et al. |
| 2011/0063838 A1 | 3/2011 | Dau et al. |
| 2011/0063843 A1 | 3/2011 | Cook |
| 2011/0063855 A1 | 3/2011 | Vissenberg |
| 2011/0122616 A1 | 5/2011 | Hochstein |
| 2011/0163681 A1 | 7/2011 | Dau et al. |
| 2011/0163683 A1 | 7/2011 | Steele et al. |
| 2011/0170289 A1 | 7/2011 | Allen et al. |
| 2011/0180818 A1 | 7/2011 | Lerman et al. |
| 2011/0187273 A1 | 8/2011 | Summerford et al. |
| 2011/0193105 A1 | 8/2011 | Lerman et al. |
| 2011/0193106 A1 | 8/2011 | Lerman et al. |
| 2011/0193114 A1 | 8/2011 | Lerman et al. |
| 2011/0195532 A1 | 8/2011 | Lerman et al. |
| 2011/0198631 A1 | 8/2011 | Lerman et al. |
| 2011/0198632 A1 | 8/2011 | Lerman et al. |
| 2011/0199769 A1 | 8/2011 | Bretschneider et al. |
| 2011/0199783 A1* | 8/2011 | Shih .................. G02B 6/0043 362/606 |
| 2011/0204390 A1 | 8/2011 | Lerman et al. |
| 2011/0204391 A1 | 8/2011 | Lerman et al. |
| 2011/0210861 A1 | 9/2011 | Winton et al. |
| 2011/0228527 A1 | 9/2011 | Van Gorkom et al. |
| 2011/0233568 A1 | 9/2011 | An et al. |
| 2011/0248287 A1 | 10/2011 | Yuan et al. |
| 2011/0249467 A1 | 10/2011 | Boonekamp |
| 2011/0261570 A1 | 10/2011 | Okada et al. |
| 2011/0273079 A1 | 11/2011 | Pickard et al. |
| 2011/0273882 A1 | 11/2011 | Pickard |
| 2011/0280043 A1 | 11/2011 | Van Ostrand et al. |
| 2011/0299807 A1 | 12/2011 | Kim et al. |
| 2011/0305018 A1 | 12/2011 | Angelini et al. |
| 2011/0305027 A1 | 12/2011 | Ham |
| 2011/0317436 A1 | 12/2011 | Kuan |
| 2012/0008338 A1 | 1/2012 | Ono et al. |
| 2012/0014128 A1 | 1/2012 | Lin |
| 2012/0020108 A1 | 1/2012 | Chang |
| 2012/0026728 A1 | 2/2012 | Lou et al. |
| 2012/0026828 A1 | 2/2012 | Fjellstad et al. |
| 2012/0033445 A1 | 2/2012 | Desmet et al. |
| 2012/0039073 A1 | 2/2012 | Tong |
| 2012/0051041 A1 | 3/2012 | Edmond et al. |
| 2012/0068615 A1 | 3/2012 | Duong |
| 2012/0069575 A1 | 3/2012 | Koh et al. |
| 2012/0069579 A1 | 3/2012 | Koh et al. |
| 2012/0069595 A1 | 3/2012 | Catalano |
| 2012/0075873 A1 | 3/2012 | Cooper |
| 2012/0113676 A1 | 5/2012 | Van Dijk et al. |
| 2012/0114284 A1 | 5/2012 | Ender |
| 2012/0120651 A1 | 5/2012 | Peck |
| 2012/0140461 A1 | 6/2012 | Pickard |
| 2012/0147624 A1 | 6/2012 | Li et al. |
| 2012/0152490 A1 | 6/2012 | Wen et al. |
| 2012/0170266 A1 | 7/2012 | Germain et al. |
| 2012/0170316 A1 | 7/2012 | Lee et al. |
| 2012/0170318 A1 | 7/2012 | Tsai et al. |
| 2012/0182767 A1 | 7/2012 | Pectavich et al. |
| 2012/0188774 A1 | 7/2012 | Okada |
| 2012/0212957 A1 | 8/2012 | Hyun et al. |
| 2012/0230019 A1 | 9/2012 | Peifer |
| 2012/0242930 A1 | 9/2012 | Ryu et al. |
| 2012/0250296 A1 | 10/2012 | Lu et al. |
| 2012/0250319 A1 | 10/2012 | Dau et al. |
| 2012/0257383 A1 | 10/2012 | Zhang |
| 2012/0268931 A1 | 10/2012 | Lerman et al. |
| 2012/0268932 A1 | 10/2012 | Lerman et al. |
| 2012/0287619 A1 | 11/2012 | Pickard et al. |
| 2012/0287654 A1 | 11/2012 | He et al. |
| 2012/0287677 A1 | 11/2012 | Wheatley et al. |
| 2012/0298181 A1 | 11/2012 | Cashion et al. |
| 2012/0307496 A1 | 12/2012 | Phillips et al. |
| 2012/0320626 A1 | 12/2012 | Quilici et al. |
| 2012/0326614 A1 | 12/2012 | Tsuji et al. |
| 2013/0003363 A1 | 1/2013 | Lu et al. |
| 2013/0003409 A1 | 1/2013 | Vissenberg et al. |
| 2013/0010464 A1 | 1/2013 | Shuja et al. |
| 2013/0028557 A1 | 1/2013 | Lee et al. |
| 2013/0033867 A1 | 2/2013 | Coplin et al. |
| 2013/0037838 A1 | 2/2013 | Speier et al. |
| 2013/0038219 A1 | 2/2013 | Dau et al. |
| 2013/0039050 A1 | 2/2013 | Dau et al. |
| 2013/0039090 A1 | 2/2013 | Dau et al. |
| 2013/0044480 A1 | 2/2013 | Sato et al. |
| 2013/0077298 A1 | 3/2013 | Steele et al. |
| 2013/0107518 A1 | 5/2013 | Boyer et al. |
| 2013/0107527 A1 | 5/2013 | Boyer et al. |

(56) References Cited

U.S. PATENT DOCUMENTS

| | | |
|---|---|---|
| 2013/0107528 A1 | 5/2013 | Boyer et al. |
| 2013/0121024 A1* | 5/2013 | Barth .................. G02B 6/0038 |
| | | 362/607 |
| 2013/0128593 A1 | 5/2013 | Luo |
| 2013/0170210 A1 | 7/2013 | Athalye |
| 2013/0201715 A1 | 8/2013 | Dau et al. |
| 2013/0208461 A1 | 8/2013 | Warton et al. |
| 2013/0208495 A1 | 8/2013 | Dau et al. |
| 2013/0214300 A1 | 8/2013 | Lerman et al. |
| 2013/0215612 A1 | 8/2013 | Garcia |
| 2013/0223057 A1 | 8/2013 | Gassner et al. |
| 2013/0229804 A1 | 9/2013 | Holder et al. |
| 2013/0229810 A1 | 9/2013 | Pelka et al. |
| 2013/0250584 A1 | 9/2013 | Wang et al. |
| 2013/0279198 A1 | 10/2013 | Lin et al. |
| 2013/0294059 A1 | 11/2013 | Galluccio et al. |
| 2013/0294063 A1 | 11/2013 | Lou et al. |
| 2013/0300310 A1 | 11/2013 | Hu |
| 2013/0328073 A1 | 12/2013 | Lowes et al. |
| 2013/0336001 A1 | 12/2013 | Boonekamp |
| 2013/0343045 A1 | 12/2013 | Lodhie et al. |
| 2013/0343055 A1 | 12/2013 | Eckert et al. |
| 2013/0343079 A1 | 12/2013 | Unger et al. |
| 2014/0003041 A1 | 1/2014 | Dau et al. |
| 2014/0029257 A1 | 1/2014 | Boyer et al. |
| 2014/0036510 A1 | 2/2014 | Preston et al. |
| 2014/0071687 A1 | 3/2014 | Tickner et al. |
| 2014/0168955 A1 | 6/2014 | Gershaw |
| 2014/0211457 A1 | 7/2014 | Tarsa et al. |
| 2014/0211462 A1 | 7/2014 | Keller et al. |
| 2014/0211476 A1 | 7/2014 | Yuan et al. |
| 2014/0211495 A1 | 7/2014 | Yuan et al. |
| 2014/0211496 A1 | 7/2014 | Durkee |
| 2014/0211497 A1 | 7/2014 | Yuan et al. |
| 2014/0211502 A1 | 7/2014 | Keller et al. |
| 2014/0211503 A1 | 7/2014 | Tarsa |
| 2014/0211504 A1 | 7/2014 | Yuan et al. |
| 2014/0211508 A1 | 7/2014 | Yuan et al. |
| 2014/0212090 A1 | 7/2014 | Wilcox et al. |
| 2014/0268761 A1 | 9/2014 | Raleigh et al. |
| 2014/0268762 A1 | 9/2014 | Raleigh et al. |
| 2014/0268875 A1 | 9/2014 | Durkee |
| 2014/0268879 A1 | 9/2014 | Mizuyama et al. |
| 2014/0334126 A1 | 11/2014 | Speier et al. |
| 2014/0347885 A1 | 11/2014 | Wilcox et al. |
| 2014/0355297 A1 | 12/2014 | Castillo et al. |
| 2014/0355302 A1 | 12/2014 | Wilcox et al. |
| 2015/0003059 A1 | 1/2015 | Haitz et al. |
| 2015/0049507 A1 | 2/2015 | Shani et al. |
| 2015/0049511 A1 | 2/2015 | Tarsa et al. |
| 2015/0055369 A1 | 2/2015 | Tarsa et al. |
| 2015/0055371 A1 | 2/2015 | van de Ven et al. |
| 2015/0109820 A1 | 4/2015 | Wilcox et al. |
| 2015/0160396 A1 | 6/2015 | Wilcox et al. |
| 2015/0177439 A1 | 6/2015 | Durkee et al. |
| 2015/0192742 A1 | 7/2015 | Tarsa et al. |
| 2015/0198760 A1 | 7/2015 | Wilcox et al. |
| 2015/0204491 A1 | 7/2015 | Yuan et al. |

FOREIGN PATENT DOCUMENTS

| | | | |
|---|---|---|---|
| DE | 10047101 | 5/2002 | |
| DE | 10203106 | 7/2003 | |
| DE | 10302563 | 7/2004 | |
| DE | 10302564 | 7/2004 | |
| DE | 102006009325 | 9/2007 | |
| DE | 102006011296 | 9/2007 | |
| DE | 102006013343 | 9/2007 | |
| EP | 1417438 | 5/2004 | |
| EP | 1662279 | 5/2006 | |
| EP | 2390556 | 11/2011 | |
| JP | H10173870 | 6/1998 | |
| JP | 2000147264 | 5/2000 | |
| JP | 2004/227934 A | 8/2004 | |
| JP | 3093080 | 12/2005 | |
| JP | 2006131444 A * | 5/2006 | ........... C03B 37/012 |
| JP | 2006/0221922 A | 8/2006 | |
| JP | 2007/123130 A | 5/2007 | |
| WO | WO 96/21122 | 7/1996 | |
| WO | WO 96/21884 | 7/1996 | |
| WO | WO 99/04531 | 1/1999 | |
| WO | WO 03/016784 | 2/2003 | |
| WO | WO 03/031869 | 4/2003 | |
| WO | WO 2009/012484 | 1/2009 | |
| WO | WO 2011/130648 | 10/2011 | |
| WO | WO 2013/078463 | 5/2013 | |
| WO | WO 2013/082537 | 6/2013 | |
| WO | WO 2014/120968 | 8/2014 | |
| WO | WO 2014/120971 | 8/2014 | |
| WO | WO 2014120672 A2 | 8/2014 | |
| WO | WO 2014/145283 | 9/2014 | |
| WO | WO 2014120672 A3 | 9/2014 | |

OTHER PUBLICATIONS

U.S. Appl. No. 13/657,421, filed Oct. 22, 2012 (38 pages).
Web page at http://www.oluce.com/en/lamps/table/colombo-281-detail, printed Nov. 19, 2013 (2 pages).
International Search Report and Written Opinion dated Jul. 24, 2014, for International Application No. PCT/US2014/28887, Applicant, Cree, Inc. (15 pages).
International Search Report and Written Opinion for International Application No. PCT/US2014/013408, issued Jul. 17, 2014, Applicant, Cree, Inc. (21 pages).
Invitation to Pay Additional Fees for International Application No. PCT/US2014/013408, issued May 8, 2014, Applicant, Cree, Inc. (2 pages).
International Search Report and Written Opinion dated Jul. 28, 2014, for International Application No. PCT/US2014/28938, Applicant, Cree, Inc. (19 pages).
Drain, Kieran, "Transformations in Lighting: 2011 DOE Solid-State Lighting R&D Workshop, Panel 3: Novel Lighting Concepts for Large Interior Spaces," PowerPoint presentation printed Nov. 2013 (23 pages).
Ji et al., Electrically Controllable Microlens Array Fabricated by Anisotropic Phase Separation From Liquid-Crystal and Polymer Composite Materials, Jul. 1, 2003 (4 pages).
Iijima et al., Document scanner using polymer waveguides with a microlens array, Oct. 28, 2002 (4 pages).
Non-final Office action dated Jul. 31, 2015 for U.S. Appl. No. 14/015,801, Applicant, Cree, Inc. (48 pages).
Non-final Office action dated Jun. 10, 2015, for U.S. Appl. No. 13/842,521, Applicant, Cree, Inc. (53 pages).
Non-final Office action dated Mar. 24, 2015, for U.S. Appl. No. 13/839,949 Applicant, Cree, Inc. (31 pages).
Non-final Office action dated Jun. 2, 2015, for U.S. Appl. No. 13/841,622, Applicant, Cree, Inc. (58 pages).
Non-final Office action dated Jun. 11, 2015, for U.S. Appl. No. 13/938,877, Applicant, Cree, Inc. (40 pages).
Non-final Office action dated Apr. 30, 2015, for U.S. Appl. No. 14/101,132, Applicant, Cree, Inc. (21 pages).
Non-final Office action dated Aug. 12, 2015, for U.S. Appl. No. 14/577,730, Applicant, Cree, Inc. (52 pages).
Non-final Office action dated May 20, 2015 for U.S. Appl. No. 14/101,051, Applicant, Cree, Inc. (17 pages).
Non-final Office action dated Feb. 27, 2015, U.S. Appl. No. 14/292,778, Applicant, Cree, Inc. (10 pages).
Invitation to Pay Additional Fees for International Application No. PCT/US2015/032011 dated Aug. 6, 2015, Applicant, Cree, Inc. (2 pages).
Invitation to Pay Additional Fees for International Application No. PCT/US2015/032040 dated Aug. 6, 2015, Applicant, Cree, Inc. (2 pages).
Invitation to Pay Additional Fees for International Application No. PCT/US2015/020601 dated Jun. 5, 2015, Applicant, Cree, Inc. (2 pages).

(56) References Cited

OTHER PUBLICATIONS

International Search Report and Written Opinion for International Application No. PCT/US2015/020601, Applicant, Cree, Inc. dated Jul. 31, 2015, (23 pages).
IPRP for International Application No. PCT/US2014/013840, Applicant, Cree, Inc. dated Aug. 13, 2015 (10 pages).
International Search Report and Written Opinion for International Application No. PCT/US2014/013840, Applicant, Cree, Inc. dated Jul. 28, 2014, (17 pages).
IPRP for International Application No. PCT/US2014/013937, Applicant, Cree, Inc. dated Aug. 13, 2015 (16 pages).
International Search Report and Written Opinion for International Application No. PCT/US2014/013937, Applicant, Cree, Inc., dated Jul. 11, 2014 (29 pages).
IPRP for International Application No. PCT/US2014/013891, Applicant, Cree, Inc., dated Aug. 13, 2015, (8 pages).
International Search Report and Written Opinion for International Application No. PCT/US14/30017, Applicant, Cree, Inc., dated Aug. 1, 2014, (21 pages).
International Search Report and Written Opinion for International Application No. PCT/US2014/072848, Applicant, Cree, Inc., dated Mar. 25, 2015, (17 pages).
IPRP for International Application No. PCT/US2014/013934, Applicant, Cree, Inc., dated Aug. 13, 2015, (11 pages).
IPRP for International Application No. PCT/US2014/013854, Applicant, Cree, Inc., dated Aug. 13, 2015, (9 pages).
IPRP for International Application No. PCT/US2014/013931, Applicant, Cree, Inc., dated Aug. 13, 2015, (15 pages).
IPRP for International Application No. PCT/US2014/013408, Applicant, Cree, Inc., dated Aug. 13, 2015, (15 pages).
U.S. Appl. No. 14/618,884, filed Feb. 10, 2015, Inventors, Castillo, et al. (56 pages).
U.S. Appl. No. 14/618,819, filed Feb. 10, 2015, Inventors, Bendtsen, et al. (37 pages).
U.S. Appl. No. 61/932,058, filed Jan. 27, 2014, Inventors, Carrigan et al. (203 pages).
U.S. Appl. No. 14/462,322, filed Aug. 18, 2014, Inventors, Castillo et al. (31 pages).
U.S. Appl. No. 29/496,754, filed Jul. 16, 2014, Inventors, Pope et al. (35 pages).
U.S. Appl. No. 14/801,476, filed Jul. 16, 2015, Inventors, de Sugny et al. (38 pages).
U.S. Appl. No. 14/472,078, filed Aug. 28, 2014, Inventors, Tarsa et al. (60 pages).
U.S. Appl. No. 14/726,152, filed May 29, 2015, Inventors, Yuan, et al. (57 pages).
Non-final Office action dated Mar. 24, 2015, for U.S. Appl. No. 13/840,563, Applicant, Cree, Inc. (36 pages).
U.S. Appl. No. 62/088,375, filed Dec. 5, 2014, Inventors, Hussell et al. (51 pages).
U.S. Appl. No. 14/291,829, filed May 30, 2014, Inventors, Yuan, et al. (65 pages).
U.S. Appl. No. 14/292,001, filed May 30, 2014, Inventors, Hu et al. (38 pages).
U.S. Appl. No. 14/292,286, filed May 30, 2014, Inventors, McBryde et al. (103 pages).
U.S. Appl. No. 14/657,988, filed Mar. 13, 2015, Inventors, Wilcox et al. (181 pages).
Non-final Office action dated Jun. 30, 2015, for U.S. Appl. No. 14/583,415, Applicant, Cree, Inc. (216 pages).
U.S. Appl. No. 14/839,557, filed Aug. 28, 2015, Inventors, Wilcenski et al. (63 pages).
International Preliminary Report on Patentability dated Sep. 24, 2015, for International Application Serial No. PCT/US2014/ 28887, Applicant, Cree, Inc., (9 pages).
European Patent Office Extended European Search Report issued Sep. 16, 2016 for Application No. EP14764347 filed in the European Regional Phase on Sep. 1, 2015, Applicant, Cree, Inc. (10 pages).

\* cited by examiner

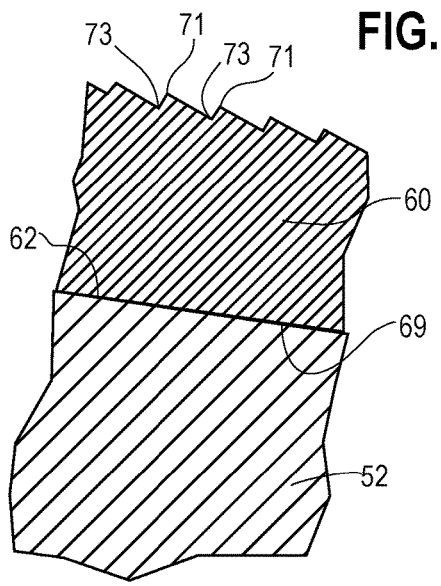
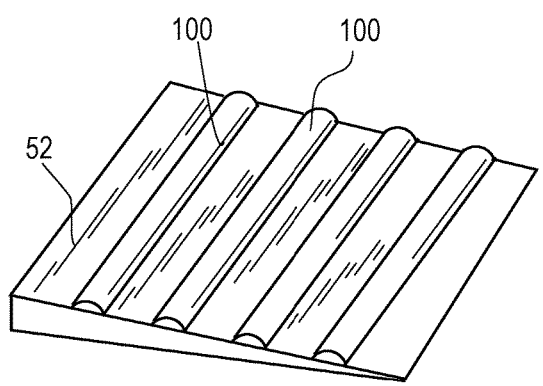
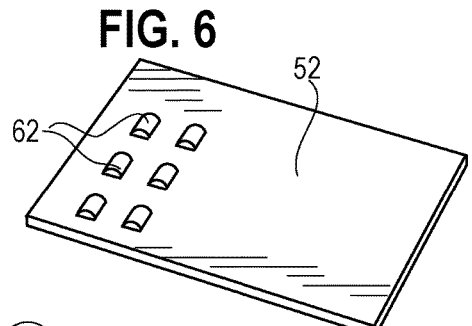
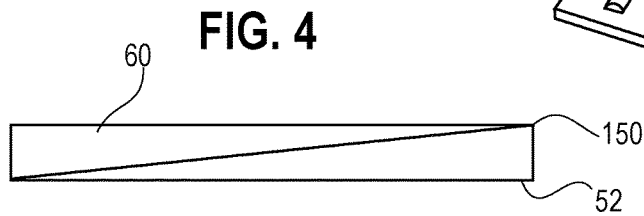
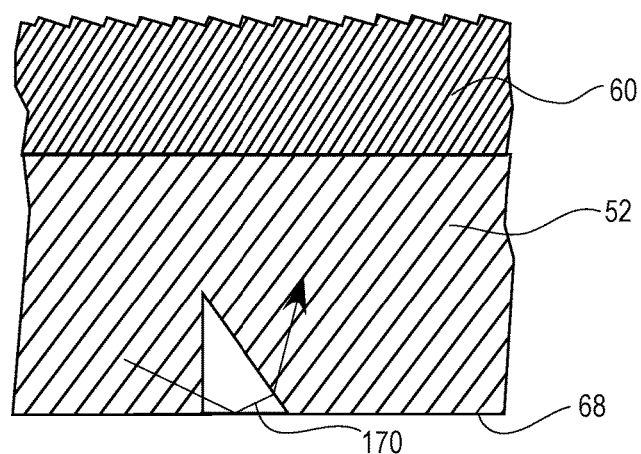

OPTICAL WAVEGUIDE BODY

CROSS REFERENCE TO RELATED APPLICATIONS

Not applicable

REFERENCE REGARDING FEDERALLY SPONSORED RESEARCH OR DEVELOPMENT

Not applicable

SEQUENTIAL LISTING

Not applicable

BACKGROUND OF THE INVENTION

1. Field of the Invention

The present inventive subject matter relates to optical waveguides, and more particularly to optical waveguides for general lighting.

2. Background of the Invention

An optical waveguide mixes and directs light emitted by one or more light sources, such as one or more light emitting diodes (LEDs). A typical optical waveguide includes three main components: one or more coupling elements, one or more distribution elements, and one or more extraction elements. The coupling component(s) direct light into the distribution element(s), and condition the light to interact with the subsequent components. The one or more distribution elements control how light flows through the waveguide and is dependent on the waveguide geometry and material. The extraction element(s) determine how light is removed by controlling where and in what direction the light exits the waveguide.

When designing a coupling optic, the primary considerations are: maximizing the efficiency of light transfer from the source into the waveguide; controlling the location of light injected into the waveguide; and controlling the angular distribution of the light in the coupling optic. One way of controlling the spatial and angular spread of injected light is by fitting each source with a dedicated lens. These lenses can be disposed with an air gap between the lens and the coupling optic, or may be manufactured from the same piece of material that defines the waveguide's distribution element(s). Discrete coupling optics allow numerous advantages such as higher efficiency coupling, controlled overlap of light flux from the sources, and angular control of how the injected light interacts with the remaining elements of the waveguide. Discrete coupling optics use refraction, total internal reflection, and surface or volume scattering to control the distribution of light injected into the waveguide.

After light has been coupled into the waveguide, it must be guided and conditioned to the locations of extraction. The simplest example is a fiber-optic cable, which is designed to transport light from one end of the cable to another with minimal loss in between. To achieve this, fiber optic cables are only gradually curved and sharp bends in the waveguide are avoided. In accordance with well-known principles of total internal reflectance light traveling through a waveguide is reflected back into the waveguide from an outer surface thereof, provided that the incident light does not exceed a critical angle with respect to the surface.

In order for an extraction element to remove light from the waveguide, the light must first contact the feature comprising the element. By appropriately shaping the waveguide surfaces, one can control the flow of light across the extraction feature(s). Specifically, selecting the spacing, shape, and other characteristic(s) of the extraction features affects the appearance of the waveguide, its resulting distribution, and efficiency.

Hulse U.S. Pat. No. 5,812,714 discloses a waveguide bend element configured to change a direction of travel of light from a first direction to a second direction. The waveguide bend element includes a collector element that collects light emitted from a light source and directs the light into an input face of the waveguide bend element. Light entering the bend element is reflected internally along an outer surface and exits the element at an output face. The outer surface comprises beveled angular surfaces or a curved surface oriented such that most of the light entering the bend element is internally reflected until the light reaches the output face Parker et al. U.S. Pat. No. 5,613,751 discloses a light emitting panel assembly that comprises a transparent light emitting panel having a light input surface, a light transition area, and one or more light sources. Light sources are preferably embedded or bonded in the light transition area to eliminate any air gaps, thus reducing light loss and maximizing the emitted light. The light transition area may include reflective and/or refractive surfaces around and behind each light source to reflect and/or refract and focus the light more efficiently through the light transition area into the light input surface of the light emitting panel. A pattern of light extracting deformities, or any change in the shape or geometry of the panel surface, and/or a coating that causes a portion of the light to be emitted, may be provided on one or both sides of the panel members. A variable pattern of deformities may break up the light rays such that the internal angle of reflection of a portion of the light rays will be great enough to cause the light rays either to be emitted out of the panel or reflected back through the panel and emitted out of the other side.

A.L.P. Lighting Components, Inc. of Niles, Ill., manufactures a waveguide having a wedge shape with a thick end, a narrow end, and two main faces therebetween. Pyramid-shaped extraction features are formed on both main faces. The wedge waveguide is used as an exit sign such that the thick end of the sign is positioned adjacent a ceiling and the narrow end extends downwardly. Light enters the waveguide at the thick end and is directed down and away from the waveguide by the pyramid-shaped extraction features.

SUMMARY OF THE INVENTION

According to one aspect of the present invention, an optical waveguide body includes a first layer of optically transmissive material and a second layer of optically transmissive material in contact with the first layer. At least one of the first and second layers is tapered and the first layer has a first index of refraction and the second layer has a second index of refraction less than the first index of refraction and the first and second indices of refraction are both greater than about 1.0.

In accordance with another aspect of the present invention, an optical waveguide body includes first and second layers of first and second optically transmissive materials, respectively, wherein the first layer is tapered from an input surface to an end surface. The first and second materials have first and second different indices of refraction, respectively, and both of the first and second indices of refraction are greater than about 1.0. Further, the second layer has a textured outer surface.

In accordance with yet another aspect of the present invention, an optical waveguide body includes first and second layers of first and second optically transmissive materials, respectively, wherein the first layer is tapered from an input surface to an end surface. The first and second materials have first and second different indices of refraction, respectively, wherein the first index of refraction is greater than the second index of refraction, and both of the first and second indices of refraction are greater than about 1.0. Further, the second layer has a textured outer surface.

Other aspects and advantages of the present invention will become apparent upon consideration of the following detailed description and the attached drawings.

BRIEF DESCRIPTION OF THE DRAWINGS

FIG. 3B is an enlarged fragmentary view of a portion of the first and second layers of FIG. 2;

FIG. 4 is a side elevational view of a further embodiment of a waveguide body;

FIG. 5 is an isometric view of yet another embodiment of a waveguide body;

FIG. 6 is an isometric view of a still further embodiment of a waveguide body;

FIG. 7 is a sectional view similar to FIG. 3 of another embodiment of a waveguide body.

DETAILED DESCRIPTION OF THE PREFERRED EMBODIMENTS

Figure 1:
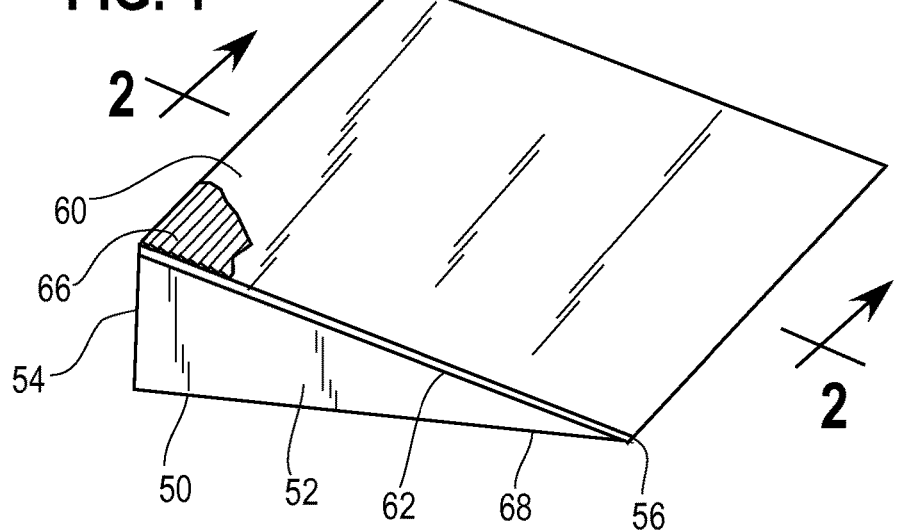
FIG. 1 is an isometric view of a first embodiment of a waveguide body.

An optical waveguide includes a waveguide body that mixes and directs light out one or more surfaces. A typical waveguide body requires multiple layers of optical materials to control and extract light from the waveguide body. While each additional layer affords increased optical control, such a design can be expensive owing to the number of layers that are used and optical losses are typically encountered at each interface between layers.

In accordance with one aspect, the present invention is directed to the distribution and extraction of light from an optical waveguide with a high degree of control and a minimal number of layers. In a particular embodiment, a waveguide body achieves a high degree of optical control, optical efficiency, and aesthetic appearance with only two layers. The first layer is a block or other shaped body of optically transmissive material. The first layer may be tapered in that the layer has opposed major surfaces, a relatively thick input surface disposed at first ends of the major surfaces and into which light developed by a light source is coupled and further having a relatively thin end surface disposed at second ends of the major surfaces. The second layer is also an optically transmissive material, and is bonded to one of the major surfaces of the first layer. The outside surface of the second layer may be formed with an array of surface features. The second layer has an index of refraction lower than the first layer and higher than the surrounding environment. Thus, for example, if the first layer has an index of refraction of 1.5 and the surrounding environment is air having an index of refraction of 1.0, the second layer has an index of refraction between 1.5 and 1.0.

In this particular embodiment, because the first layer is tapered, the light inside bounces at increasingly steep angles against its surfaces through total internal reflection (TIR) and eventually escapes the first layer. This extraction occurs when the light reaches the layer's critical angle, which is defined by the difference in refractive index between the material of the first layer and its surrounding environment. Because the difference in refractive indices between the first layer and the second layer is less than the difference in refractive indices between the first layer and air, the critical angle at the bonded interface is reduced. As a result, light escapes through the bonded interface before light can escape through any of the non-bonded surfaces. In addition, in a particular embodiment, the surface texture of the second layer is selected to control the angular distribution of the extracted light. In this way, both the spatial location of extraction and angular direction of extraction are controlled.

It has been found that by selecting the degree of taper of the first layer and the index of refraction of the second layer, light can be extracted solely through the bonded interface, with negligible light escaping from other surfaces. This may eliminate or at least reduce the need for a reflector behind the waveguide body to collect any stray light. Inasmuch as the second layer serves the purposes of both extraction and distribution control, such element eliminates the need for a still further layer that controls light after extraction.

The interface between the first layer and the second layer, particularly, the surface finish of the interface and the method of bonding, are important considerations. The second layer could be created by one of many methods: a solid layer of controlled index material deposited on the first layer, a thin film micropatterned on the exterior surface of the first layer, a curable coating applied to the surface of the first layer, etc. are all possible. The two-layer construction could even be created by bonding two similar layers together and then subsequently changing the index of refraction of one or both of the layers.

In the example described above, the second layer may cover an entire surface of the first layer and only extracts light from a single side. However, it should be evident that the present invention applies to a wide range of waveguide geometries where extraction must be controlled with as few layers as possible. Additionally, raising the refractive index of the second layer above the index of refraction of the surrounding environment can serve a similar purpose as lowering the index of the extraction layer. Such an arrangement may even afford additional control, as the critical angle between the waveguide body and surrounding environment (such as air) becomes harder to break. The relative refractive index values between the adjacent layers is an important consideration.

The present invention controls stray light, provides high efficiency extraction and highly uniform extraction, and can be used to create a fully luminous output. The present invention can be used in any type of lamp or luminaire, such as a troffer.

Still further, the materials used herein may include an acrylic material, a silicone, a polycarbonate, or other suitable material(s) to achieve a desired effect and/or appearance.

Figure 2:
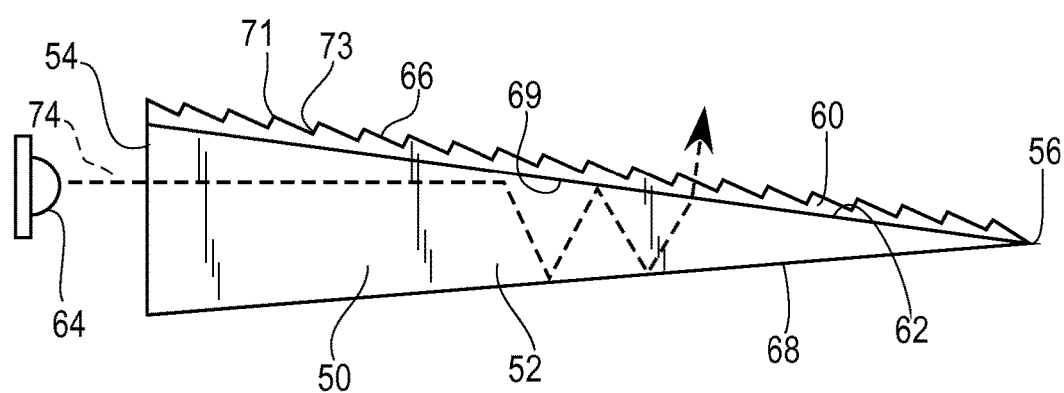
FIG. 2 is a sectional view of the waveguide body taken along the lines 2-2 of FIG. 1 in conjunction with a light source.

Referring to FIGS. 1 and 2, a waveguide body 50 includes a first portion or layer 52 having an input surface 54 and an end surface 56 opposite the input surface 54. A second layer 60 is bonded or otherwise secured to a first major surface 62 of the first layer. 52. The layers 52, 60 are optically transmissive. Light developed by one or more light sources, such as an LED 64 (FIG. 2), is directed into the input surface 54 and may be emitted out an outer surface 66 of the second layer 60.

Preferably, the first major surface 62 and an opposite major surface 68 of the first layer 52 are both planar. It should be noted, however, that either or both of these surfaces 62, 68 may be curved, if desired. Further, in the preferred embodiment, the surfaces 62 and 68 are disposed at an angle relative to one another so that the first layer 52 is tapered in overall shape. Still further in the preferred embodiment, the outer surface 66 of the second layer 60 is textured. Preferably, the textured surface 66 is stepped, so that light exiting the first layer 52 strikes the surface 66 in perpendicular fashion. This minimizes the amount of light reflected back into the body. If desired, an inner surface 69 of the second layer 60 and/or the surface 62 of the first layer may be smooth or textured. Also in the illustrated embodiment, the layer 52 is fabricated of an acrylic or other suitable optical material and has a first index of refraction. The second layer 60 is made of a different material than the first layer 52, such as silicone or a doped acrylic material, and has a second index of refraction. In the embodiment of FIGS. 1 and 2, the first index of refraction is preferably greater than the second index of refraction. Still further, in accordance with the illustrated embodiment when used in air having an index of refraction of about 1.0, the first index of refraction is about equal to 1.5 and the second index of refraction is between about 1.0 and about 1.5, and is preferably about 1.3. If desired, the waveguide body 50 may be used in a different environment having a different index of refraction less than the index of refraction of the second layer 60.

Still further in accordance with the illustrated embodiment, the textured surface 66 comprises alternating ridges and troughs 71, 73 and/or any other structures. The textured surface 66 may be formed by any suitable forming process, such as injection molding, embossing, stamping, milling, calendering, laser etching, or the like.

The light source 64 may develop light that is directly coupled into the waveguide body 50 via an air gap 74 and/or a coupling optic (not shown). The light source 64 may be a white LED or may comprise multiple LEDs including a phosphor-coated LED either alone or in combination with a color LED, such as a green LED, etc. In those cases where a soft white illumination is to be produced, the light source 64 typically includes a blue shifted yellow LED and a red LED. Different color temperatures and appearances could be produced using other LED combinations, as is known in the art. In one embodiment, the light source 64 comprises any LED, for example, an MT-G LED incorporating True-White® LED technology as developed and manufactured by Cree, Inc., the assignee of the present application.

Figure 3A:
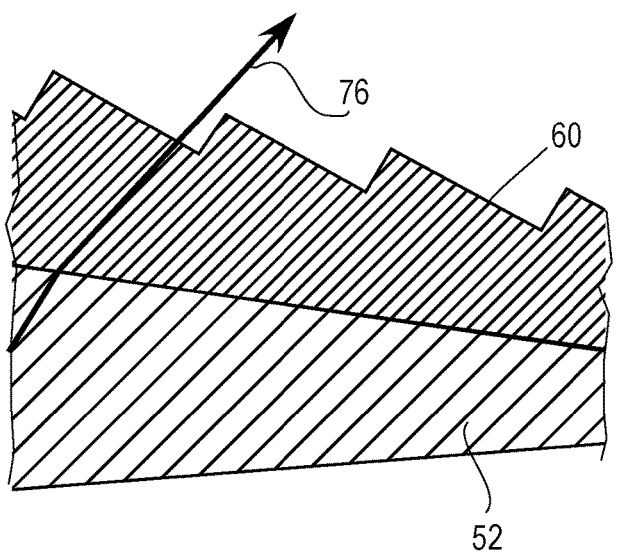
FIG. 3A is an enlarged fragmentary view of a portion of the first and second layers of FIG. 2.

Light emitted from the light source 64 enters the waveguide body 50 through the input surface 54. The light is reflected by total internal reflection within the first layer 52 until an incident angle of the light falls below a critical angle, whereupon the light passes through the second layer 60 and exits the outer surface 66, shown by the light ray 76. The waveguide body 50 is designed to emit all or substantially all of the light from the outer surface 66 as the light travels through the waveguide body 50. The light is directed outwardly in a controlled manner by the textured surface, for example, as seen by the light ray 76 of FIG. 3A.

Any remaining light that does not exit the outer surface 66 may exit the waveguide 54 at the end surface 56. Alternatively, the end surface 56 may be coated with a reflective material, such as a white or silvered material to reflect any remaining light back into the waveguide body 50, if desired.

As shown in FIGS. 1 and 2 and as described above, the taper of the waveguide body 50 is linear between the input surface 54 and the end surface 56. According to one embodiment, a first thickness at the input surface 54 is about 2 mm to about 10 or more mm, and more preferably is between about 4 mm and about 8 mm, and most preferably is equal to about 6 mm. Further, a second thickness of the end surface is 1 mm or less.

If desired, the first and/or second layers may be of other shape(s). For example, FIG. 4 illustrates an embodiment where the first layer 52 and the second layer 60 are both tapered in opposite directions and are secured together in overlapping relationship to form a waveguide body 150 that is of substantially constant thickness throughout. Preferably, the body has a thickness of about 2 mm to about 10 or more mm, and more preferably is between about 4 mm and about 8 mm, and most preferably is equal to about 6 mm.

Further, one or more discontinuous features may be used in place of or alternatively to the continuous second layer 60. FIG. 5 illustrates an embodiment wherein a discontinuous layer comprising equally spaced linear facets 100 are secured or formed atop the first layer 52. FIG. 6 shows an embodiment in which a discontinuous layer comprising discrete facets 102 are secured or formed in a regular array atop the first layer 52. If desired, the facets 100 may be unequally spaced or the discrete facets 102 may be disposed irregularly across the layer 52. In both FIGS. 5 and 6 the index of refraction of the first layer 52 is greater than the index of refraction of the facets 100 or 102 and the index of refraction of the surroundings is less than the index of refraction of the facets 100 or 102. Preferably, the facets 100, 102 are smooth. In general, the number, geometry, and spatial array of such features across the first layer 52 affects the uniformity and distribution of emitted light.

FIG. 7 illustrates an embodiment in which a body of material 170 is disposed in the first layer 52. The body of material may be bonded to the layer 52. Contrary to the previous embodiments, the first layer 52 has an index of refraction less than an index of refraction of the body of material 170. The body of material 170 may, for example, be a polycarbonate plastic material having an index of refraction of about 1.6. The body of material 170 is shown as being v-shaped, although other shapes could alternatively be used. Other similar or identical bodies of material could be disposed at spaced locations in the layer 52. The layer 52 with the bodies of material 170 therein, and, optionally, the layer 60, direct light away from the surface 68 so that substantially all light is directed out the surface 66.

Figure 8:
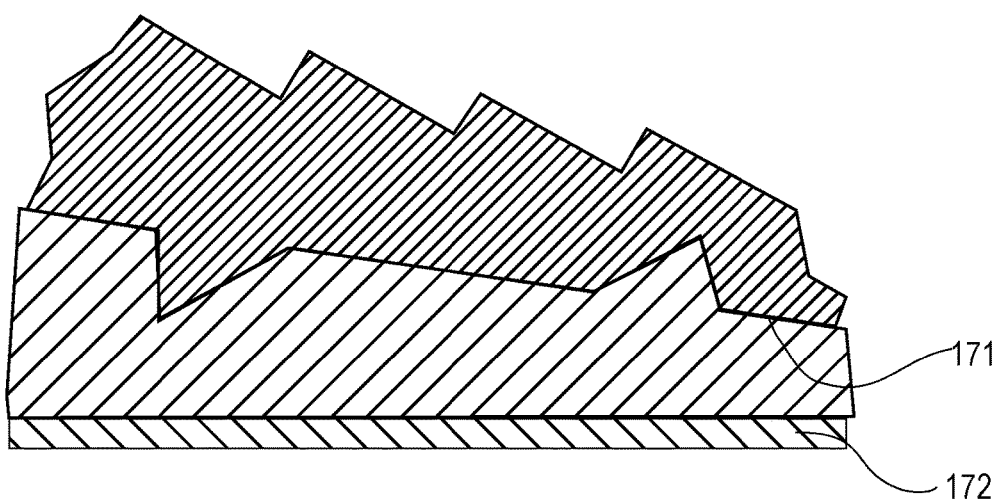
FIG. 8 is an enlarged, fragmentary, cross sectional view of an alternative embodiment of a waveguide body according to the present invention.

Other embodiments of the disclosure including all of the possible different and various combinations of the individual features of each of the foregoing embodiments and examples are specifically included herein. For example, the material used as the second layer 60 may have a varying index of refraction over the extent thereof. The waveguide and the components thereof may have different shapes. In addition, the various layers need not be of the shapes described, and one layer could extend into or away from the adjacent layer, if desired. Such an embodiment is shown in FIG. 8, in which the layers have a non-planar interface 171. Also as seen in FIG. 8, a reflective layer or coating may be disposed on a bottom surface of the first layer 52. The reflective layer 172 may be a specular material, a white diffuse material, or the like.

INDUSTRIAL APPLICABILITY

The waveguide layers and other components described herein may be used singly or in combination. In any case, one may obtain a desired light output distribution using a minimum number of optical layers.

Numerous modifications to the present disclosure will be apparent to those skilled in the art in view of the foregoing description. Accordingly, this description is to be construed as illustrative only and is presented for the purposes of enabling those skilled in the art to make and use the present disclosure and to teach the best mode of carrying out the same.

I claim:

1. An optical waveguide body, comprising:
   a first layer of optically transmissive material comprising a thickness defined by a first side and second side;
   a second layer of optically transmissive material comprising a third side and a fourth side opposite the third side, said third side in contact with the second side of the first layer;
   wherein the first layer has a first index of refraction and the second layer has a second index of refraction less than the first index of refraction and wherein the first and second indices of refraction are both greater than about 1.0; and
   a body of material extending into the first layer from the first side and comprising an index of refraction greater than the first index of refraction, wherein the second layer comprises a plurality of ridges and grooves on the fourth side, wherein each of the ridges comprises a first height, wherein the body of material comprises a second height that is larger than the first height.

2. The optical waveguide body of claim 1, wherein the second layer is discontinuous.

3. The optical waveguide body of claim 2, wherein the second layer comprises linear facets.

4. The optical waveguide body of claim 2, wherein the second layer comprises discrete facets.

5. The optical waveguide body of claim 1, wherein the second layer is continuous and extends fully over the first layer.

6. The optical waveguide body of claim 1, in combination with a light emitting diode (LED) that develops light which is transmitted into the waveguide body.

7. The optical waveguide body of claim 1, wherein the first and second layers are tapered in opposite directions and are secured together in overlapping relationship.

8. The optical waveguide body of claim 1, wherein the waveguide body has a substantially constant thickness throughout.

9. The optical waveguide body of claim 1, further comprising a reflective layer disposed on the first side of the first layer opposite the second layer.

10. The optical waveguide body of claim 9, wherein the reflective layer is a specular material.

11. The optical waveguide body of claim 9, wherein the reflective layer is a white diffuse material.

12. The optical waveguide body of claim 1, wherein an interface between the first and second layers is non-planar.

13. The optical waveguide body of claim 1, wherein one of the first and second layers extends into another of the layers.

14. The optical waveguide body of claim 1, wherein the first layer has an index of refraction that varies over the extent thereof.

15. The optical waveguide body of claim 1, wherein at least one of the first and second layers is tapered.

* * * * *